US008700488B2

(12) United States Patent
Frost et al.

(10) Patent No.: US 8,700,488 B2
(45) Date of Patent: Apr. 15, 2014

(54) FLEXIBLE DATA STORE FOR IMPLEMENTING A STREAMLINED ACQUISITION PROCESS

(75) Inventors: Stephen Peter Frost, South Riding, VA (US); Eva L. Griffeth, Arlington, VA (US); John Gregory Leigh, Vienna, VA (US); Robert Rudolph Menna, Great Falls, VA (US); Michelle Louise Snow, Arlington, VA (US)

(73) Assignee: Noblis, Inc., Falls Church, VA (US)

( * ) Notice: Subject to any disclaimer, the term of this patent is extended or adjusted under 35 U.S.C. 154(b) by 608 days.

(21) Appl. No.: 12/289,360

(22) Filed: Oct. 27, 2008

(65) Prior Publication Data

US 2010/0106617 A1    Apr. 29, 2010

(51) Int. Cl.
    *G06Q 30/00*    (2012.01)
(52) U.S. Cl.
    USPC ............... 705/26.44; 705/26.1; 705/27.1
(58) Field of Classification Search
    USPC .............................................. 705/26, 27
    See application file for complete search history.

(56) References Cited

U.S. PATENT DOCUMENTS

| | | | |
|---|---|---|---|
| 6,356,909 B1 | 3/2002 | Spencer | |
| 6,647,373 B1 | 11/2003 | Carlton-Foss | |
| 7,130,802 B1 | 10/2006 | Mehregany et al. | |
| 2001/0044749 A1* | 11/2001 | Heisler et al. | 705/26 |
| 2002/0032610 A1 | 3/2002 | Gold et al. | |
| 2002/0091614 A1 | 7/2002 | Yehia et al. | |
| 2003/0097296 A1 | 5/2003 | Putt | |
| 2003/0216928 A1* | 11/2003 | Shour | 705/1 |
| 2004/0167789 A1 | 8/2004 | Roberts et al. | |
| 2005/0165654 A1 | 7/2005 | Westcott et al. | |
| 2006/0010023 A1 | 1/2006 | Tromczynski et al. | |
| 2006/0041496 A1 | 2/2006 | Amin | |
| 2006/0047598 A1 | 3/2006 | Hansen | |
| 2006/0059073 A1* | 3/2006 | Walzak | 705/35 |
| 2008/0033856 A1 | 2/2008 | Stoffman et al. | |
| 2008/0172574 A1* | 7/2008 | Fisher | 714/25 |
| 2008/0270313 A1 | 10/2008 | Cullen et al. | |
| 2008/0300933 A1 | 12/2008 | Britton et al. | |
| 2009/0204431 A1 | 8/2009 | Mancini et al. | |
| 2010/0088239 A1 | 4/2010 | Blair et al. | |
| 2010/0106544 A1 | 4/2010 | Frost et al. | |
| 2010/0106545 A1 | 4/2010 | Frost et al. | |
| 2010/0106617 A1 | 4/2010 | Frost et al. | |

OTHER PUBLICATIONS

Sprague, C., Pahountis, L., & Jennings, B. (2000). e-procurement: Little glamour, lots of value. 33 Metal Producing, 38(1), 18.*
AcquTrak for the Web End-User Guide.
AcquTrak RFP Q&A Module—End-User Guide.

(Continued)

*Primary Examiner* — Resha Desai
(74) *Attorney, Agent, or Firm* — Finnegan, Henderson, Farabow, Garrett & Dunner, LLP

(57) ABSTRACT

Methods and systems for seamlessly integrating an end-to-end acquisition process using a flexible data structure are disclosed. A flexible data structure consistent with these methods and systems may connect the buyer's requirement to the vendor's proposed solution, facilitating a requirement-by-requirement evaluation process allowing buyers to evaluate content as well as price of a proposal. Embodiments of the present invention standardize the format of proposals, allowing buyers to more easily compare vendors' proposals side-by-side. Still other embodiments of the present invention produce an error checking report to further aid vendors in improving proposals and buyers in evaluating proposals.

21 Claims, 9 Drawing Sheets

(56) References Cited

OTHER PUBLICATIONS

Noblis Acquisition Process Tracking Tool (AcquTrak) product literature.
Noblis' Acquisition Support Center (AcquCenter) product literature.
Kathleen L. Eaves and Robert S. Wassmann, "Elements of a Best Process", Noblis publication *Sigma: Acquisition Strategies*, Feb. 2007, pp. 29-33.
U.S. Appl. No. 12/289,358, filed on Oct. 27, 2008 (50 pages).
U.S. Appl. No. 12/289,359, filed on Oct. 27, 2008 (47 pages).
Office Action, dated Sep. 19, 2011, for U.S. Appl. No. 12/289,358, filed Oct. 27, 2008 (18 pages).
Office Action, dated Sep. 14, 2011, for U.S. Appl. No. 12/289,359, filed Oct. 27, 2008 (18 pages).
Office Action dated Feb. 3, 2011, in corresponding U.S. Appl. No. 12/289,359.
Office Action mailed Sep. 6, 2012, in U.S. Appl. No. 12/289,358 (21 pages).

\* cited by examiner

FLEXIBLE DATA STORE FOR IMPLEMENTING A STREAMLINED ACQUISITION PROCESS

This application is related to application Ser. No. 12/289,358, filed on Oct. 27, 2008, and application Ser. No. 12/289,359, filed on Oct. 27, 2008. The entire contents of these two related applications are hereby incorporated by reference.

TECHNICAL FIELD

This invention generally relates to business practices for managing an integrated acquisition process, and more specifically to methods and systems that allow buyers to efficiently and accurately define requirements and to efficiently and accurately evaluate proposals; allow vendors to efficiently and accurately develop and refine proposals; and allow buyers to efficiently and accurately award and manage the resulting relationship between the parties.

BACKGROUND

Large organizations, both governmental and non-governmental, often need to acquire goods or services, sometimes on a large scale over a number of years. In many situations, these goods or services cannot be purchased off-the-shelf. In order to meet their specialized needs, such organizations may need to issue requirements and ask vendors to offer proposals on how to address these requirements. Large-scale acquisitions may involve millions or even billions of dollars and can result in multi-year contracts.

Such deals may be quite complex; in fact, the acquisition process alone may take years before the agreement is even executed. In many cases, e.g., for reasons of fairness or safety, laws or regulations govern how the acquisition process occurs. For example, the Federal Aviation Administration follows certain safety and reliability guidelines when acquiring new computers to manage the Nation's air space. In another example, when a government entity looks to acquire the services of a contractor, that government agency may follow certain requirements of the Federal Acquisition Regulations ("FAR").

SUMMARY

Certain embodiments of the present invention are directed to methods and systems that seamlessly integrate an end-to-end acquisition process using a flexible data structure. A flexible data structure consistent with these methods and systems may connect the buyer's requirement to the vendor's proposed solution, facilitating a requirement-by-requirement evaluation process. Such a granular process allows buyers to evaluate content as well as price, to more efficiently and effectively determine a true "value" of a proposal. Embodiments of the present invention standardize the format of proposals, allowing buyers to more easily compare vendors' proposals side-by-side. Still other embodiments of the present invention produce an error checking report indicating the deficiencies in a proposal to further aid vendors in improving proposals and buyers in evaluating proposals.

Yet another embodiment provides a library to allow buyers to review and/or re-use requirements such as those that have been vetted already and are known to produce a good proposed solution from vendors. Likewise, vendors may access a library to review and/or re-use solutions to requirements such as those that match the goods or services that the vendor has successfully produced in past agreements.

Other embodiments of the present invention facilitate a standardized evaluation process that results in a higher quality final agreement with fewer mistakes, produced in a shorter period of time. The invention implements the acquisition process with less back and forth communication between buyer and vendors, virtually eliminating "cross-talk."

A electronic front-end consistent with certain embodiments of the present invention allows buyers to view a consistent buyer-side format to establish requirements and allows vendors to view a consistent vendor-side format to respond to buyer's requirements.

Still other embodiments of the present invention provide a corporate memory storing information regarding the acquisition process including multiple versions of requirements and proposals, communication between buyers and vendors, questions, requests for clarification about the requirements, proposals, etc. Such corporate memory may be helpful, for example, in the event of an audit or protest by a chosen or non-chosen vendor.

One aspect of the disclosure is directed to a method for facilitating a process for a buyer to make an acquisition using an interactive tool that may include receiving by the interactive tool requirements for the acquisition from the buyer, representing each of the requirements as a data element in a data structure associated with the interactive tool, presenting by the interactive tool a request for proposal based on the stored data elements to potential vendors for the acquisition, enabling development of proposed solutions to the request for proposal by one or more of the potential vendors via the interactive tool, for each of the one or more potential vendors, linking solution items of the vendor's proposed solution to the data elements representing the requirements, via the data structure, providing, by the interactive tool, analysis to the buyer using the linked data elements and solution items to facilitate the buyer selecting a chosen vendor for the acquisition, and enforcing, by the interactive tool, a pre-determined schedule for the buyer's selection process. Another aspect of the disclosure is directed to a method for facilitating a process for a buyer to make an acquisition using an interactive tool that may include receiving by the interactive tool requirements for the acquisition from the buyer, representing each of the requirements as a data element in a data structure associated with the interactive tool, presenting by the interactive tool a request for proposal based on the stored data elements to potential vendors for the acquisition, enabling development of proposed solutions to the request for proposal by one or more of the potential vendors via the interactive tool, for each of the one or more potential vendors, linking solution items of the vendor's proposed solution to the data elements representing the requirements via the data structure, providing by the interactive tool analysis to the buyer using the linked data elements and solution items to facilitate the buyer selecting a chosen vendor for the acquisition, receiving an element of the vendor's proposed solution related to a primary requirement in the set of requirements, determining that a particular data element that vendor has provided a solution item has a corresponding linked data element, determining that the vendor has not provided a solution item for the corresponding linked data element, notifying the buyer of the missing solution item for the corresponding linked data element, and enforcing, by the interactive tool, a pre-determined schedule for the buyer's selection process. Further, another aspect of the disclosure is directed to an apparatus for enabling a buyer to make an acquisition according to a pre-determined schedule that may include an online acquisition management tool configured to receive requirements for the acquisition from the buyer, present the requirements to potential vendors for the acquisition, enable one or more of the potential vendors to develop a proposed solution to the requirements, and facilitate the buyer in implementing a predetermined schedule selecting a chosen vendor for the acquisition from among the vendors developing a proposed solution; and a data structure associated with the online acquisition management tool configured to store each requirement as a data element and link the data element for each requirement to a corresponding solution item in each vendor's proposed solution.

BRIEF DESCRIPTION OF THE DRAWINGS

The accompanying drawings, which are incorporated in and constitute a part of this specification, exemplify certain aspects of the present invention and, together with the description, serve to explain some of the principles associated with the invention. In the drawings.

DETAILED DESCRIPTION

In the following detailed description, reference will be made to the accompanying drawings, in which like numerals represent like elements throughout the figures. The accompanying figures illustrate exemplary embodiments consistent with the present invention, which are described in sufficient detail to enable those skilled in the art to practice the invention. It is to be understood that other implementations may be utilized and that structural and method changes may be made without departing from the scope of the present invention. The following discussion is, therefore, not to be construed in a limiting sense.

Figure 1:
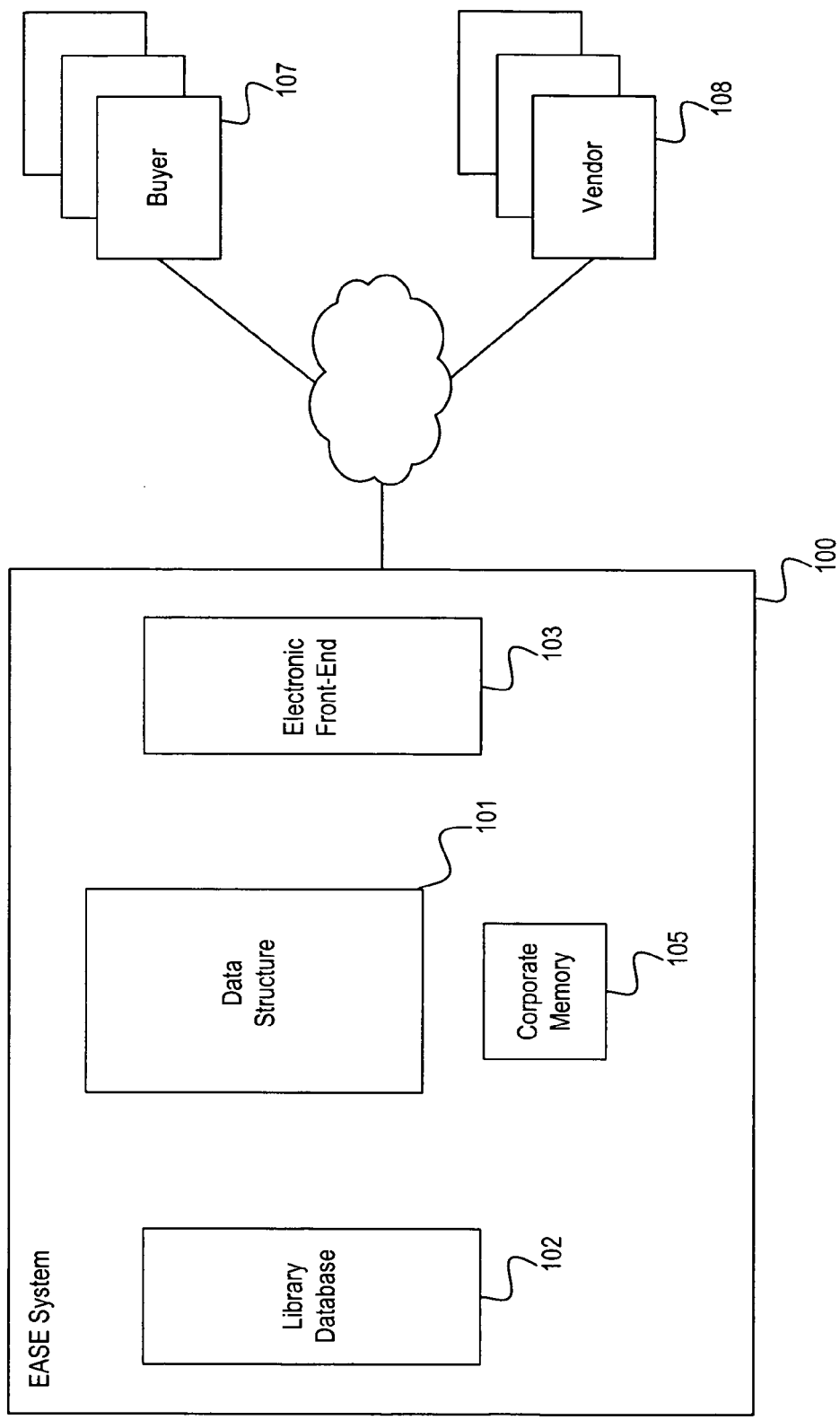
FIG. 1 is a block diagram of a system for performing an integrated acquisition process in accordance with embodiments of the present invention.

FIG. 1 is a block diagram of a system for performing an integrated acquisition process consistent with embodiments of the present invention. The system of FIG. 1 may include an Enterprise Acquisition Services Environment ("EASE") system 100 with a flexible data structure 101, a library 102, a front-end 103, and a corporate memory 105. EASE system 100 communicates with one or more buyers 107 and vendors 108. EASE system 100 may be used, for example, to allow a buyer 107 to acquire products or services from a vendor 108 following a set of rules. The rules may be promulgated, for example, by the federal government, such as the FAR, by state or local governments, by quasi-governmental organizations or by other regulatory bodies. Buyer 107 may be, for example, a governmental agency or similar organization at the federal, state, or local level, a corporation, a partnership, a non-profit organization, or an individual. Vendor 108 may be any entity that provides goods or services.

Buyers 107 and vendors 108 may access EASE system 100 over a network such as an intranet or the Internet using front-end 103. Front-end 103 may serve as a user-friendly portal by which buyers 107 and vendors 108 may access EASE system 100, using technology. Alternatively, buyers 107 and vendors 108 may download software from a server to enable them to access EASE system 100, via a user portal located at buyers 107 and/or vendors 108. Additionally, buyers 107 may use electronic front-end 103 to perform individual evaluations of proposals of vendors 108, to perform a side-by-side comparison and evaluation of proposals from vendors 108, etc.

Flexible data structure 101 may store information related to buyers 107, vendors 108, requirements, proposals, etc. Electronic front-end 103 may enable buyers 107 and vendors 108 to store information related to the acquisition process in flexible data structure 101. For example, buyers 107 may use flexible data structure 101 to define the structure and format vendors 108 must use to respond to specific requirements issued by buyers 107. Alternatively, buyers 107 may use flexible data structure 101 to suggest a structure and format which vendors 108 may use to respond to specific requirements issued by buyers 107. Flexible data structure 101 may also facilitate a check for inconsistencies between requirements specified by buyers 107 and requirements that vendors 108 have responded to in a proposal. Flexible data structure 101 may also check for missing responses to requirements. Flexible data structure 101 also may allow buyers 107 to link requirements, for example, to require vendors 108 to respond to a group of related requirements or to draw the relationship between requirements to the attention of vendors 108.

Changes to the requirements of buyers 107 and/or the proposals of vendors 108 may be recorded in corporate memory 105. Corporate memory 105 may provide an audit trail, for example, in the event of a protest by vendors 108 who were not awarded an agreement or if a rule requires the examination of or information about the acquisition process between buyers 107 and vendors 108.

Library 102 may serve as a repository for proposal requirements, specific requirements, responses to requirements, etc., as detailed below in connection with FIGS. 3-6. Library 102 allows buyers 107 access to requirements such as previously approved requirements. Flexible data structure 101 and Library 102 may be implemented using, for example, a relational database. Any person having skill in the art would recognize that flexible data structure 101 and/or library 102 could be implemented using other types of data storage.

Figure 2:
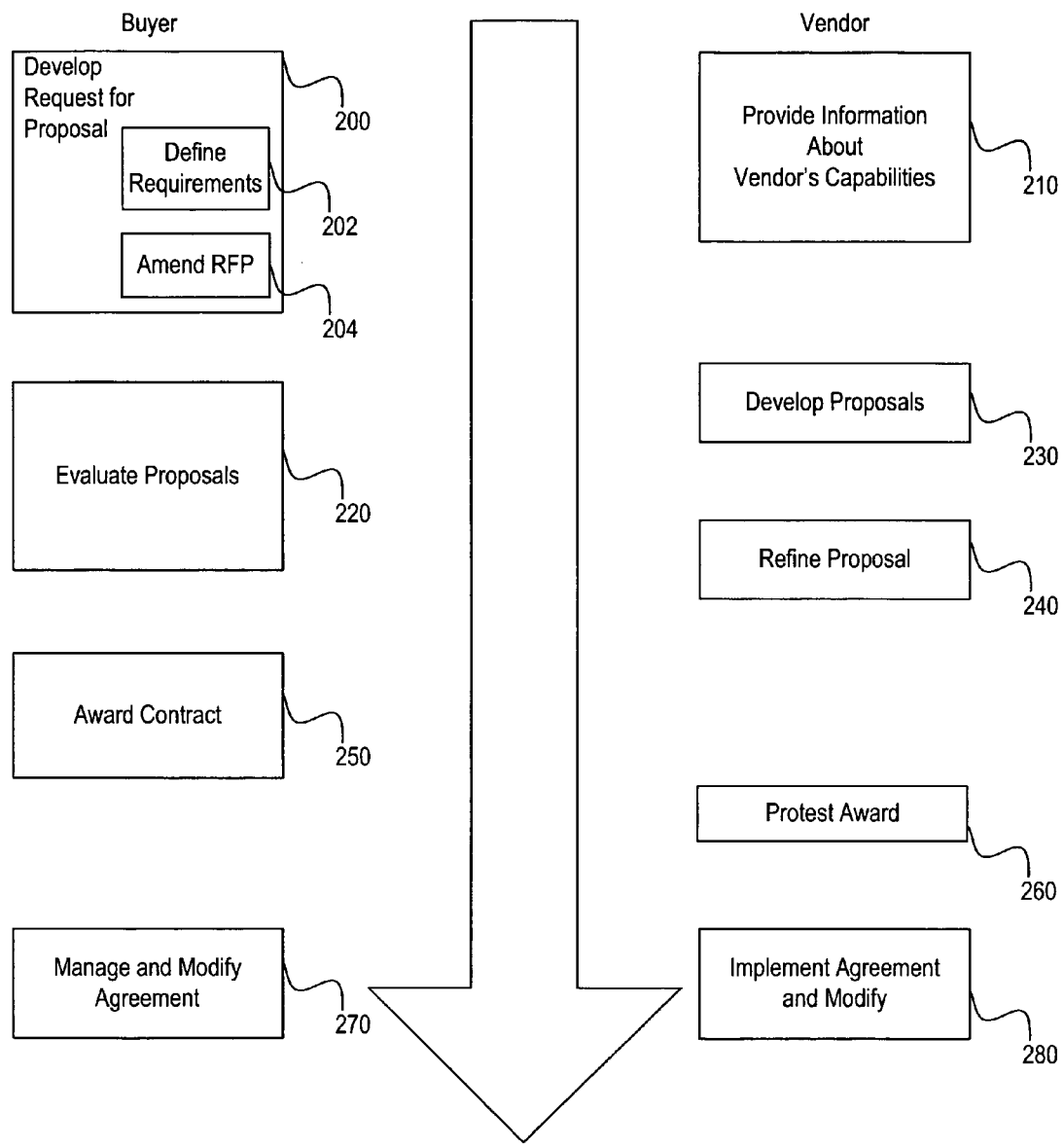
FIG. 2 is a flowchart depicting a process for performing acquisitions in accordance with embodiments of the present invention.

FIG. 2 is a flowchart depicting a process for performing acquisitions in accordance with embodiments of the present invention. The process depicted in FIG. 2 may be performed by EASE system 100 in communication with buyers 107 and vendors 108, for example, via front-end 103. Vendors 108 may provide information about the capabilities of vendors 108, including, for example, services or products offered by vendors 108 (step 210). Vendors 108 may provide this information, for example, on an on-going periodic basis, as a result of a specific request from a buyer 107, etc. In some circumstances, buyers 107 may issue a request for information to potential vendors 108 to solicit vendors to provide information about the vendors' capabilities. Buyers 107 may interact with EASE system 100, for example, to develop a request for proposal, define requirements for an acquisition, amend requests for proposals, etc. Once a request for proposal is developed, then buyers 107 may use EASE System 100 to release it to vendors 108. Following the release of a request for proposal, vendors 108 may develop proposals based on the request for proposal and associated requirements (step 230) as discussed below in FIG. 6. Buyers 107 may evaluate proposals (step 220), e.g., based on criteria established in the request for proposal. Buyers 107 may also use the EASE system 100 to request additional information from vendors 108, as discussed below in FIG. 7. Vendor 108 may also refine proposals, e.g., based on feedback from buyer 107 (step 240), as discussed in FIG. 7. Following the evaluation of proposals buyer 107 may decide to award an agreement to one or more of vendors 108 (step 250) now each designated a chosen vendor, as discussed below in FIG. 8. EASE system 100 may be used by a buyer 107 and the chosen vendor to execute an agreement such as a contract. In certain embodiments, e.g., when buyer 107 is a governmental or quasi-governmental organization, vendors 108 who are not chosen by buyer 107 may protest, which can also be facilitated by EASE system (step 260). A protest may enable vendors to appeal to a higher entity or organization. EASE system 100 may also enable buyer 107 and vendor 108 to manage a resulting contract and/or modify the contract, as discussed below in FIG. 9.

Using methods and systems consistent with the present invention, acquisitions can include any number of vendors who may participate in a single acquisition program. As a result, buyers may not be limiting their options and may choose the vendor who offers the best "value."

The process illustrated in FIG. 2 shows one exemplary implementation consistent with embodiments of the instant invention. Of course, other method steps may be used, certain steps may be omitted, and the order of steps may vary without departing from the scope of the present invention. Although some of the steps are depicted in parallel, a person having skill in the art would recognize that these steps could be performed sequentially or in any other order.

Figure 3:
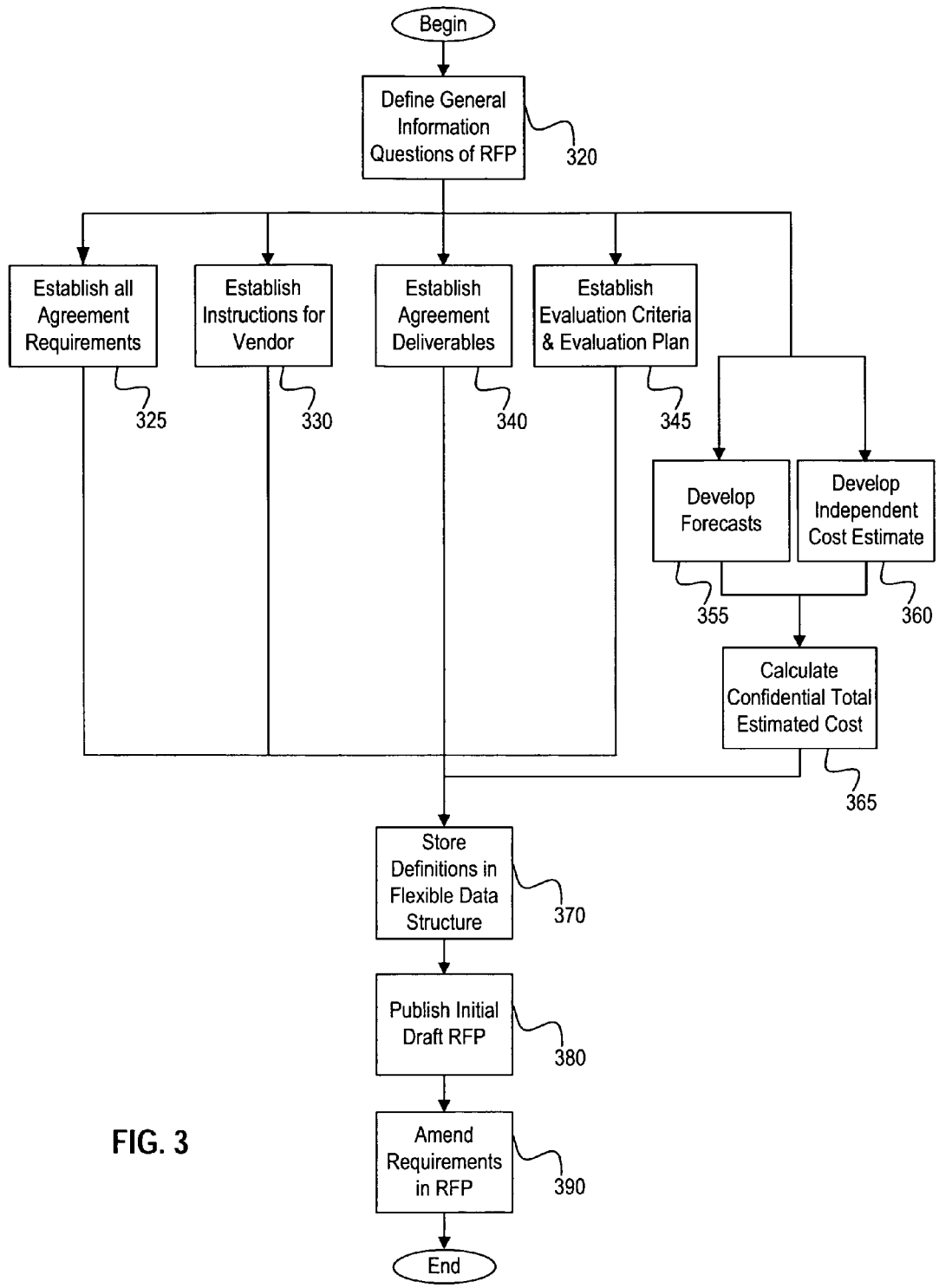
FIG. 3 depicts a module for developing a request for proposal consistent with certain embodiments of the present invention.

FIG. 3 depicts a flowchart of a process for developing a request for proposal consistent with certain embodiments of the present invention. In terms of defining requirements using methods and systems consistent with the present invention, buyers may specify mandatory requirements (often referred to as "shall statements") for the good or service being acquired, quickly identifying to the vendors where they have missed a mandatory requirement in their proposal before submission. Acquiring organizations often specify a specific format for delivering the proposal, and using methods and systems consistent with the present invention, vendors may submit proposals in the required format facilitating a side-by-side comparison with other proposals.

The process depicted in FIG. 3 may be facilitated by EASE system 100 for a buyer 107 using front-end 103, flexible data structure 101, library 102, etc. First, buyer 107 establishes General Information Questions for vendors 108 to include in a request for proposal (step 320). General Information Questions may include, for example, information about vendors 108 including management or employee experience level, technical experience level, billing information, past performance on other projects, recommendations or references from other buyers, etc. Buyer 107 may use EASE system 100 to establish General Information Questions by, for example, retrieving previously-stored data from flexible data structure 101, modifying previously stored data in flexible data structure 101, entering new data into flexible data structure 101, etc.

EASE system 100 may also enable buyer 107 to establish Critical and/or Routine Conditions for requests for proposals (step 325). Critical and Routine Conditions may define, for example, the uptime or reliability standards for the request for proposal. For example, buyer 107 may require that a primary or emergency communication circuit has a higher uptime than a secondary communication circuit. In another example, buyer 107 may require that a truck operate for a certain number of miles per year without failure. Depending on the scope of the request for proposal, buyer 107 may set stricter reliability standards for some or all of the requirements. Critical and Routine Conditions may also include, for example, information about incentives offered by buyer 107 or discounts offered by vendors 108 which may be available to buyer 107 when the standard of service for the agreement does not meet a certain minimum standard as set by buyer 107.

EASE system 100 may also enable buyer 107 to establish Instructions to Vendors for requests for proposal (step 330). Instructions for Vendors may include, for example, any information that buyer 107 wishes to communicate to vendors 108, for example, information about how to respond to the request for proposal. In one embodiment, EASE system 100 may also enable buyer 107 to compile a conformance matrix and/or a compliance matrix for proposals, which may be a cross tabulation of mandatory requirements. In certain embodiments, e.g., to promote fairness, EASE system 100 may provide the same Instructions for Vendor to all vendors 108 to ensure that all vendors 108 receive the same directions on how to build their proposals. For example, Instructions for Vendor could include basic information about how to respond to Requirements Designations. Requirements Designations may be, for example, mandatory (as in the vendor "shall" provide a certain feature for requirement), desirable (as in the vendor is not required to provide a certain feature, but it is recommended by buyer), optional (as in the vendor "may" provide a certain feature for requirement), etc.

EASE system 100 may also enable buyer 107 to establish Agreement Deliverables for requests for proposal (step 340). Agreement Deliverables may include, for example, descriptions of written work product, reports on services rendered under the agreement, products to be made as a result of the agreement, other items to be delivered from a chosen vendor to buyer 107 as part of the contract, etc. Agreement Deliverables may also include the schedule by which written work, reports, or products should be delivered to buyer 107. Buyer 107 may also define the frequency of certain reports from chosen vendor as part of the agreement, such as quarterly or monthly. Buyer 107 may also define those conditions under which buyer 107 will reject Agreement Deliverables and chosen vendor may be required to resubmit them.

EASE system 100 may also enable buyer 107 to establish Evaluation Criteria and Evaluation Plans for requests for proposals (step 345). Evaluation Criteria may include, for example, factors and/or sub-factors used to identify strengths and weakness of a proposal, a rating system to be used during evaluation of proposal, etc. In certain embodiments, this rating system may be: adjectival, such as "Excellent," "Good," and "Poor;" numerical, such as a value on a scale from 1 to 100; or non-adjectival, such as a color rating system where Purple may be the highest rating, Red may be a middle rating, and Orange may be the lowest rating. Evaluation Criteria may further include, e.g., a percentage or weight that may be afforded to different factors and/or sub-factors. In other embodiments, buyer 107 may define sub-criteria used to evaluate individual unit prices provided by vendors 108.

An Evaluation Plan may include rules for selecting a chosen vendor, security rules for the evaluation, etc. Security rules may include rules such as: (a) competing vendors 108 having access to proposals of other vendors, (b) determining which information in the proposal will remain confidential, such as the best practices of vendors 108, etc. The Evaluation Plan may also include a financial incentive program, e.g., an amount to be paid to a chosen vendor by buyer 107, sometimes called an Award Fee. The Evaluation Plan may include the possible amount of the Award, the criteria for evaluating the amount of the Award, schedule for paying the Award, etc. In some embodiments, buyer 107 may have Evaluation Criteria and/or Evaluation Plans approved by an individual or panel of individuals before publishing a request for proposal.

EASE System 100 may also enable buyer 107 to establish Agreement Requirements for requests for proposals (step 325). Agreement Requirements may include any Agreement Deliverables or any other items desired or required by buyer 107 under the terms of a contract between buyer 107 and a chosen vendor. For example, an Agreement Deliverable might be a truck, and Agreement Requirements for the truck might include specific information about the size, range, towing capacity, passenger capacity, cost, etc.

After establishing contract requirements, EASE system 100 may enable buyer 107 to develop forecasts (step 355). Forecasts may be based, for example, on requirements of buyers 107. Forecasts may include estimates of the needs of buyer 107 during the term of the contract, and amount of an item needed by buyer 107 in the future years, an amount of hours of service needed by buyer 107 in future years, etc. For example, if the federal government is buying fighter jets, then the forecast might include the number of fighter jets authorized by the United States Congress during the next ten fiscal years.

Additionally or alternatively, EASE system 100 may enable buyer 107 to develop Independent Cost Estimates. Independent Cost Estimates may or may not be provided to vendors 108. Independent Cost Estimates may be provided to vendors 108, e.g., as an expectation of individual costs of individual requirements. Alternatively, Independent Cost Estimates may be kept in confidence by buyer 107, e.g., to provide an independent benchmark of the cost of requirements. Using Forecasts and/or Independent Cost Estimates, EASE system 100 may calculate a Confidential Total Estimated Cost for the acquisition, which may or may not be provided to vendors 108 (step 365).

EASE system 100 may enable buyer 107 to store the established data, such as Critical and/or Routine Conditions, Agreement Deliverable, etc. in flexible data structure 101 (step 370). Using the information stored in flexible data structure 101, buyer 107 may then use EASE system 100 to publish a draft Request for Proposal (step 380). EASE system 100 may enable buyer 107 to amend the Request for Proposal (step 390), as discussed below in FIG. 5.

The process illustrated in FIG. 3 shows one exemplary implementation consistent with embodiments of the instant invention. Of course, other method steps may be used, certain steps may be omitted, and the order of steps may vary without departing from the scope of the present invention. Although some of the steps are depicted in parallel, a person having skill in the art would recognize that these steps could be performed sequentially or in any other order.

Figure 4:
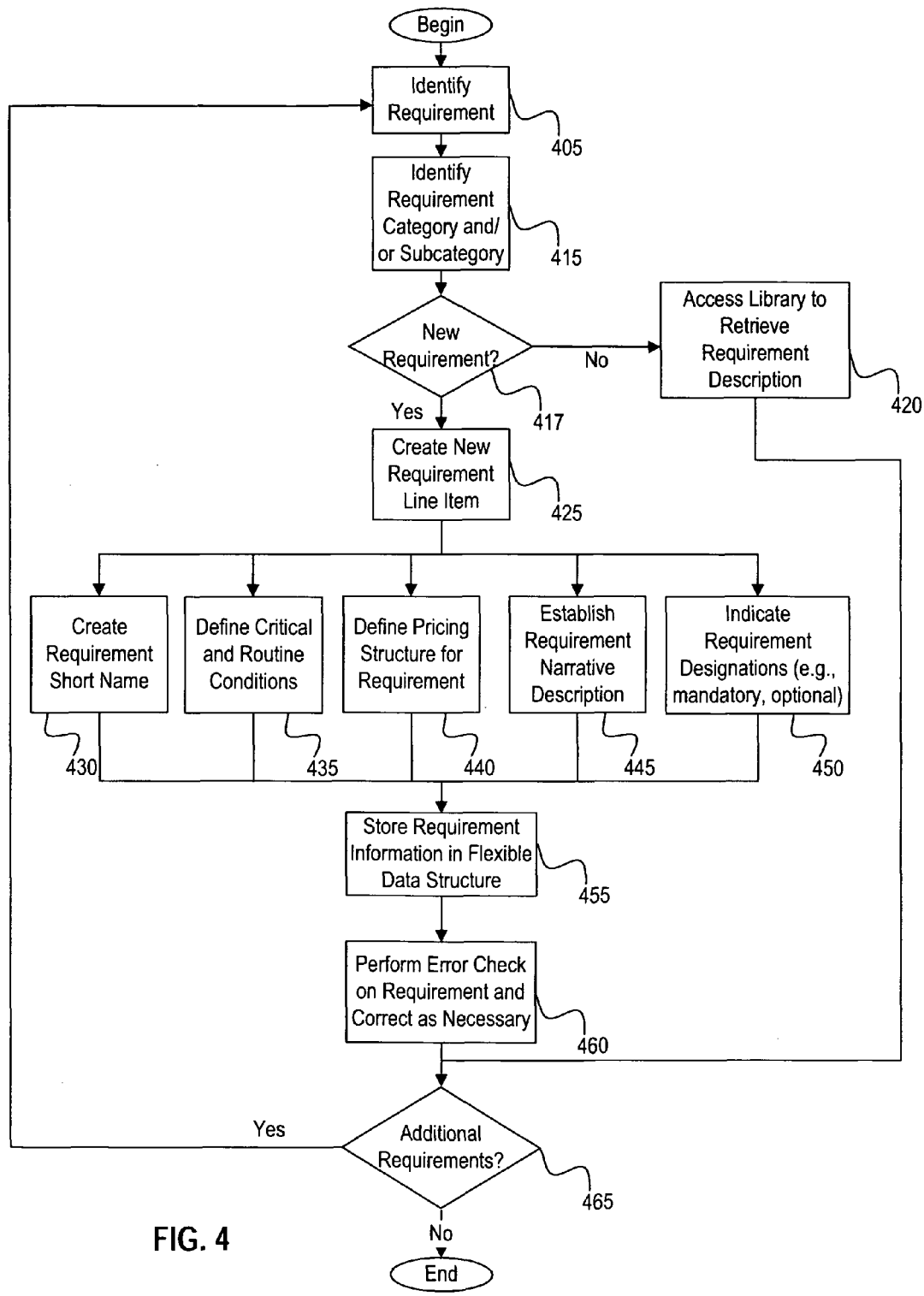
FIG. 4 depicts a module for defining requirements consistent with certain embodiments of the present invention.

FIG. 4 depicts a process for defining requirements consistent with certain embodiments of the present invention. The process depicted in FIG. 4 may be facilitated by EASE system 100 for a buyer 107 using electronic front-end 103, flexible data structure 101, library 102, etc.

First, buyer 107 identifies an individual requirement and/or a requirement category and/or subcategory (step 415). For example, in an acquisition for a submarine, buyer 107 may identify categories such as: structural, communications, propulsion, weaponry, etc. and buyer may identify subcategories for the propulsion category such as nuclear and non-nuclear. In this example, buyer 107 may identify a certain engine as a requirement with a category of propulsion and the sub-category of non-nuclear. Next, buyer 107 determines if this requirement is a new requirement (step 417). If the requirement is in library 102, then buyer 107 may use EASE system 100 to retrieve the requirement description and proceed to the next requirement, if any (step 420). If not, then buyer 107 may use EASE system 100 and define a new requirement.

To define a new requirement or modify an existing requirement from library 102, buyer 107 may use the EASE system 100 to create a new requirement line item (step 425). A requirement line item may be, for example, a reference key which is used to identify this requirement in the future, such as a number or alphanumeric string. Next, buyer 107 may use EASE system 100 to create a requirement short name, which may include a title or short descriptive phrase, for example, "Utility Truck," "Ethernet Hub," "Fighter Jet Engine," "Maintenance Services," etc. (step 430).

EASE system 100 may also enable buyer 107 to define a pricing structure for requirement, which may identify, for example, a number of different conditions or locations for which vendors 108 may be asked to provide a unit price for each requirement (step 440). For example, vendors 108 may be asked by buyer 107 to use EASE system to provide a unit price for a "Utility Truck" in the United States at various locations and/or at overseas locations. EASE system 100 may enable vendors 108 to provide a difference unit price for the same requirement at various locations at different times, etc. Buyer 107 may use EASE system 100 to indicate that a requirement meets Critical and/or Routine Conditions. For example, EASE system 100 may enable Vendors 108 to provide a different unit price for the same requirement item under different Critical and/or Routine Conditions. For example, buyer 107 may use EASE system 100 to define a Critical Condition for a satellite uplink as being operational 24 hours a day with only 30 minutes of downtime per week and a Routine Condition as being operational 24 hours a day with 12 hours of downtime per week. Continuing with the same example, EASE system may enable vendors 108 to propose different unit prices for a Critical Condition satellite uplink and a Routine Condition satellite uplink.

EASE system 100 may also enable buyer 107 to provide a requirement technical or narrative description, which may provide vendors 108 with sufficient detail about the requirement to allow vendors 108 to give an accurate estimate of the price (step 440). Buyer 107 may use EASE system 100 to link a requirement's pricing structure with its technical or narrative description so that if buyer 107 modifies the requirement's technical or narrative description, then vendors 108 would be alerted of the possible need to update the estimated price.

EASE system 100 may also enable buyer 107 to indicate a requirement designation for a requirement (step 445). EASE system 100 may also enable buyer 107 to store the requirement short name, pricing structure, requirement technical or narrative description, requirement designations, etc., in flexible data structure 101 (step 450). In one embodiment, EASE system 100 may enable buyer 107 to use the requirements and a narrative description of the requirement to compile a compliance and/or conformance matrix. In another embodiment, EASE system 100 may enable buyer 107 to use Instructions to Vendor to compile the conformance matrix.

Buyer 107 may also use EASE system 100 to facilitate a check for missing elements about the newly defined requirement (step 460). EASE system 100 may also enable buyer 107 to correct any errors found during this check. EASE system 100 may also enable buyer 107 to add additional requirements by following the process depicted in FIG. 4.

The process illustrated in FIG. 4 shows one exemplary implementation consistent with embodiments of the instant invention. Of course, other method steps may be used, certain steps may be omitted, and the order of steps may vary without departing from the scope of the present invention. Although some of the steps are depicted in parallel, a person having skill in the art would recognize that these steps could be performed sequentially or in any other order.

Figure 5:
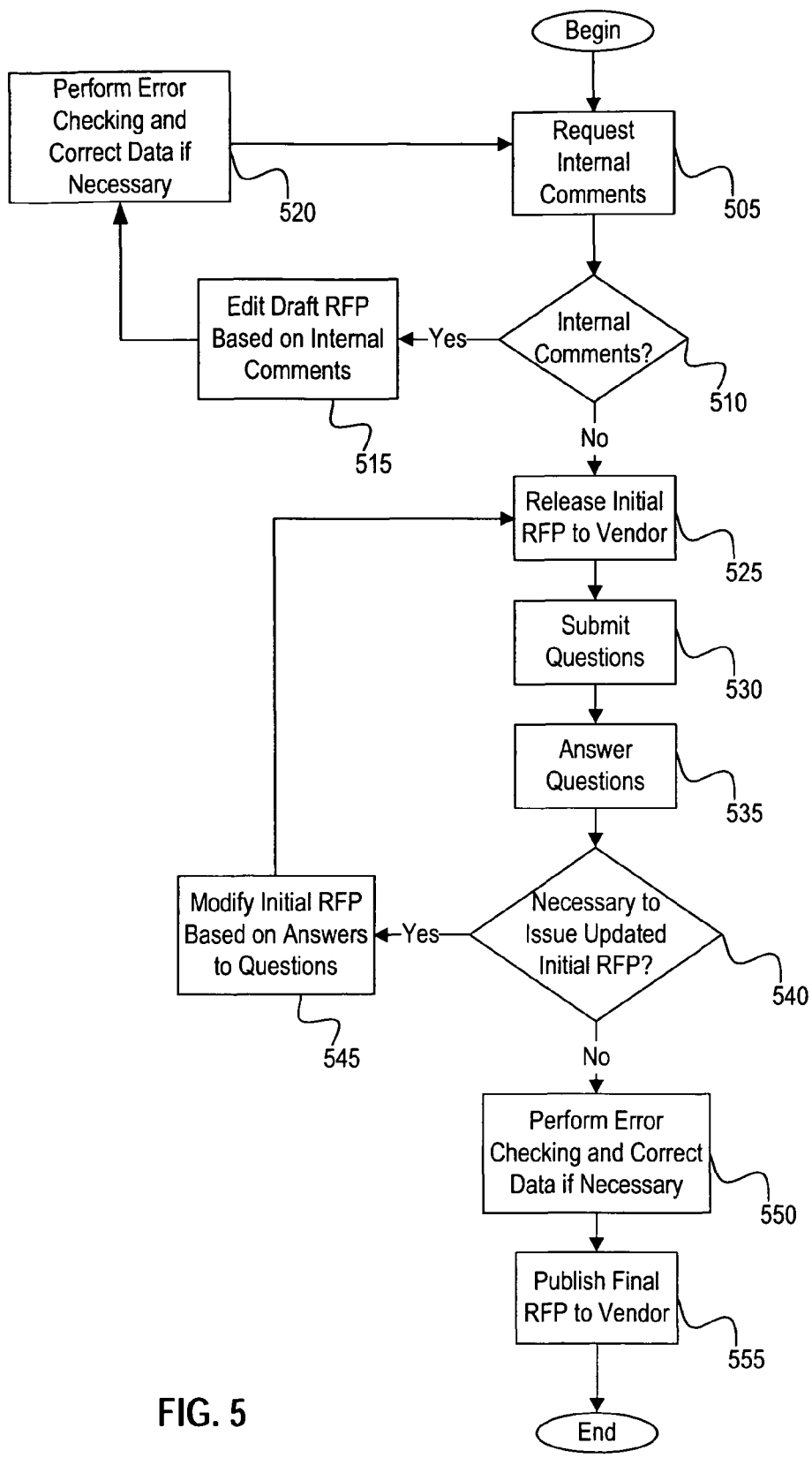
FIG. 5 depicts a module for amending a request for proposal consistent with certain embodiments of the present invention.

FIG. 5 depicts a flowchart of a process for amending a request for proposal and releasing a final request for proposal to vendors 108 consistent with certain embodiments of the present invention. The process depicted in FIG. 5 may be facilitated by EASE system 100 for a buyer 107 and vendors 108 using the electronic front-end 103, flexible data structure 101, etc.

Using methods and systems consistent with the present invention may increase efficiency in resolving clarification requests or questions from the buyer and amendments to the proposals by the vendors.

EASE system 100 may also enable buyer 107 to request internal comments, e.g., comments from individuals associated with buyers 107, on a draft request for proposal (step 505). Buyer 107 may use EASE system 100 to edit the draft request for proposal based on internal comments (step 515). In certain embodiments, EASE system 100 may enable buyer 107 to re-compile conformance and/or compliance matrices. Buyer 107 may also use EASE system 100 to facilitate a check for missing elements about the newly amended requirement (step 520). EASE system 100 may also enable buyer 107 to correct any errors found during this check (step 520).

After internal comments, EASE system 100 may also enable buyer 107 to release an initial request for proposal to vendors 108 (step 525). EASE system 100 may allow vendors 108 to submit questions about the initial request for proposal (step 530). Buyer 107 may respond to these questions (step 535). EASE system 100 may enable buyer 107 to update the initial request for proposal based on the answers to vendors' 108 questions (step 540). In certain embodiments, EASE system 100 may enable buyer 107 to re-compile the conformance and/or compliance matrices.

EASE system 100 may also enable buyer 107 to store amended initial request for proposal in the flexible data structure 101. Buyer 107 may also use EASE system 100 to facilitate a check for missing elements about the amended initial request for proposal (step 550). EASE system 100 may also enable buyer 107 to correct any errors found during this check. EASE system 100 may also enable buyer 107 to publish the final request for proposal to vendors 108 (step 550).

The process illustrated in FIG. 5 shows one exemplary implementation consistent with embodiments of the instant invention. Of course, other method steps may be used, certain steps may be omitted, and the order of steps may vary without departing from the scope of the present invention. Although some of the steps are depicted in parallel, a person having skill in the art would recognize that these steps could be performed sequentially or in any other order.

Figure 6:
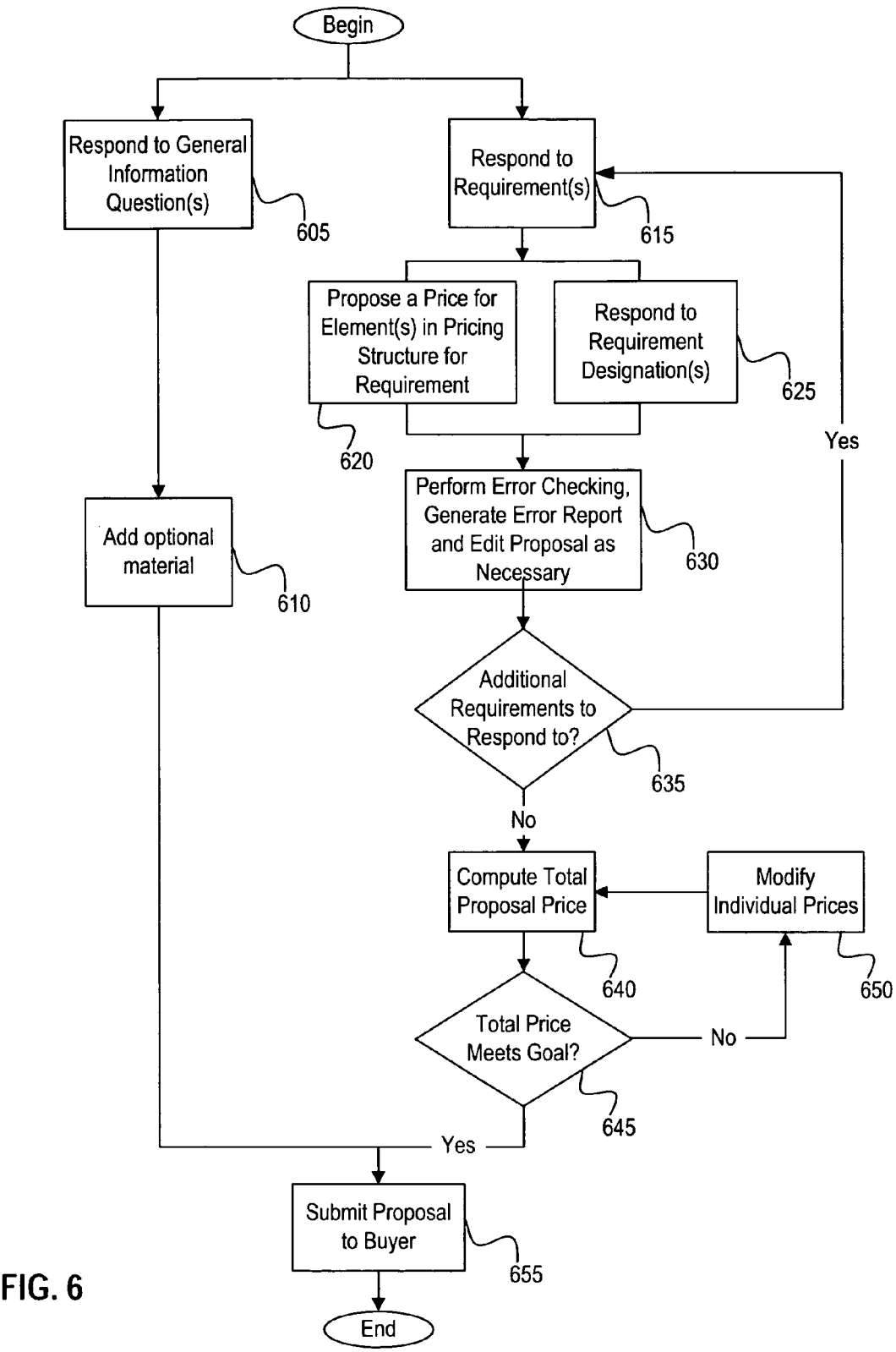
FIG. 6 depicts a module for developing proposals consistent with certain embodiments of the present invention.

FIG. 6 depicts a flowchart of a process for developing proposals consistent with certain embodiments of the present invention. The process depicted in FIG. 6 may be facilitated by EASE system 100 for vendors 108 using electronic front-end 103, flexible data structure 101, library 102, etc. Using methods and systems consistent with the present invention, vendors may calculate the cost of their own proposal to complex projects that may include multiple goods and services bundled together with different prices depending on the location where the good or service is to be provided, depending on the quality or reliability of the good or service, etc.

EASE system 100 may enable vendors 108 to respond to General Information Questions (step 605). Vendors 108 may use EASE system 100 to add optional material to the proposal, for example, to supplement the responses to the General Information Questions (step 610). For example, a General Information Question might ask about a vendor's particular experience in a field such as "Airplane Construction." In this example, the buyer might not permit vendor to include other types of experience, for example, "Rocket Construction," "Engine Construction," "Satellite Construction," etc., in response to this General Information Question. Instead, the vendor may use EASE system 100 to provide information on other types of experience in the optional material (step 610). EASE system 100 may enable vendors 108 to include, for example, general marketing, sales materials, promotional materials, etc. in optional materials.

EASE system 100 may also enable vendors 108 to respond to requirements. In certain embodiments, EASE system 100 may enable vendors 108 to use the conformance and/or compliance matrices to respond to the mandatory requirements. For each requirement, a vendor 108 proposes a price for elements in the pricing structure based on the requirement and its associated description (step 620). For example, if vendor 108 were building a proposal to offer telephone switching equipment at multiple locations around the world, then vendor 108 would propose a price for the telephone switching equipment at each location specified by buyer 107 in the pricing structure. Vendors 108 may agree or disagree with the requirement designation (step 625). For example, for the telephone switching equipment, if buyer 107 included a requirement that the equipment be able to service one hundred telephone lines simultaneously and had designated this requirement as "mandatory," then vendors 108 may, for example, agree with this requirement, disagree and give a comment as to why the requirement could not be satisfied, etc.

EASE system 100 may also enable vendors 108 to perform an error check to ensure that elements in the pricing structure have a proposed price and that vendors 108 have responded to the requirement designation (step 630). This error checking may not prevent vendors 108 from submitting proposals. EASE system 100 may generate a report that can be reviewed by vendors 108 and may be sent to buyer 107. EASE system 100 may enable vendors 108 to respond to requirements until vendors 108 have responded to all the requirements in a request for proposal (step 635).

After providing prices for elements in a pricing structure, EASE system 100 may also enable vendors 108 to compute a total proposal price. EASE system 100 may also enable vendors 108 to use the Forecast in order to calculate the total proposal price. EASE system 100 may enable vendors 108 to compare this total proposal price to a pre-determined goal. EASE system 100 may enable vendors 108 to modify individual prices within the pricing structure in order to better meet the goal. If vendor 108 modifies an individual price, then EASE system 100 may perform the error checking routine to prompt vendor 108 to reconsider responses to other coordinated or related requirement designations (step 630).

EASE system 100 may enable vendors 108 to store in flexible data structure 101, information including, for example, proposed prices, responses to requirement designations, total proposed price, etc. EASE system 100 may also enable vendors 108 to build a first proposal for submission to buyer 107. In certain embodiments EASE system 100 may enable vendors to populate the compliance and/or conformance matrices with references to the appropriate proposed solutions to various requirements.

The process illustrated in FIG. 6 shows one exemplary implementation consistent with embodiments of the instant invention. Of course, other method steps may be used, certain steps may be omitted, and the order of steps may vary without departing from the scope of the present invention. Although some of the steps are depicted in parallel, a person having skill in the art would recognize that these steps could be performed sequentially or in any other order.

Figure 7:
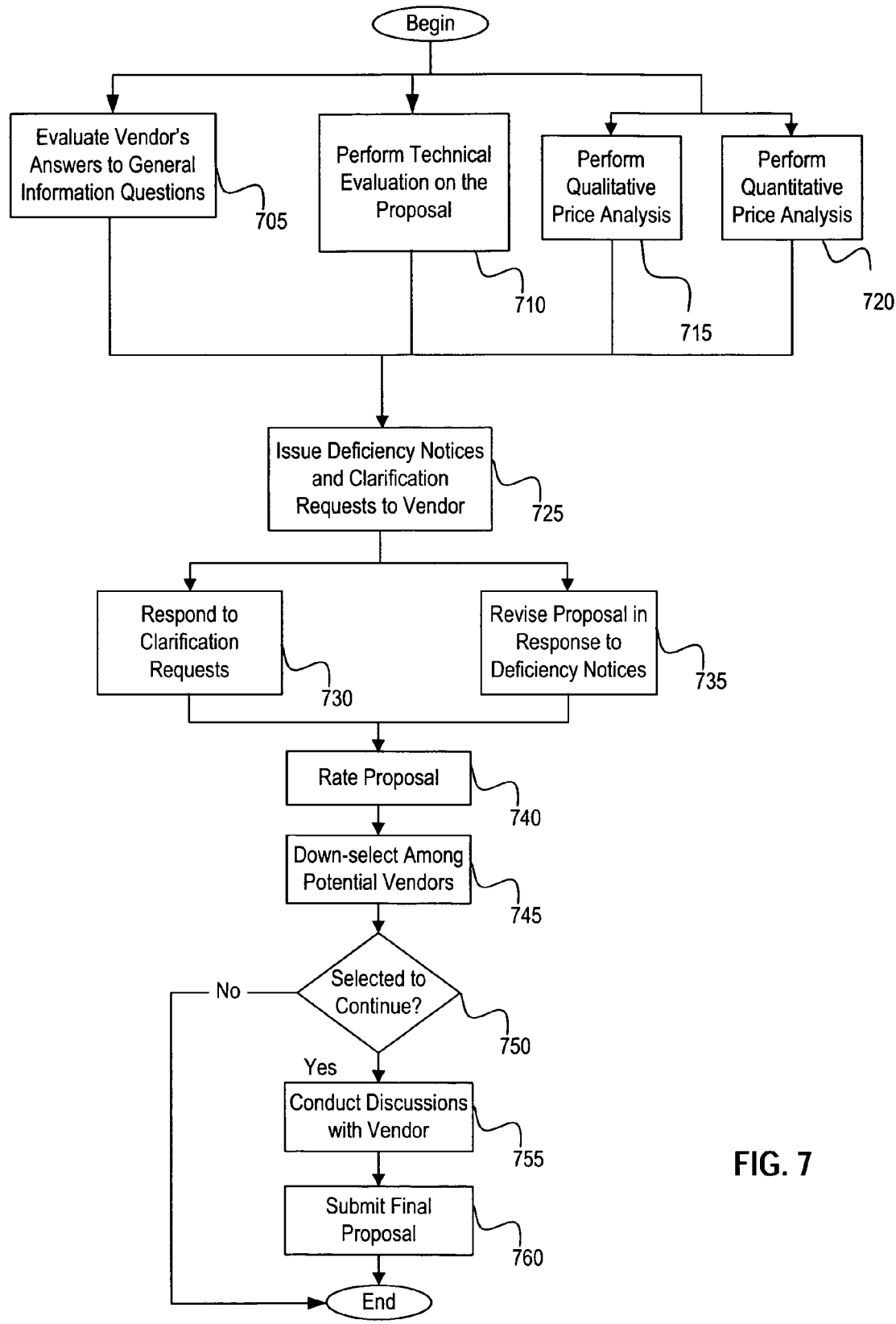
FIG. 7 depicts a module for evaluating the proposals consistent with certain embodiments of the present invention.

FIG. 7 depicts a process for evaluating proposals consistent with certain embodiments of the present invention. The process depicted in FIG. 7 may be performed by buyers 107 and vendors 108 using electronic front-end 103, in flexible data structure 101, etc.

Using methods and systems consistent with the present invention, buyers may "drill down" in the various levels of the proposals from the different vendors in order to make an accurate comparison of the "value" of each overall proposal to the buyer. Using methods and systems consistent with the present invention, buyers may connect each requirement to the vendor's proposed solution, to further facilitate comparison and evaluation.

Using methods and systems consistent with the present invention, buyers and vendors may track various versions of requirements and proposals simplifying any audit for the purpose of, for example, evaluating the quality of the existing agreement, re-competing an agreement with similar requirements, addressing an investigation as a result of a protest by a chosen or non-chosen vendor, etc.

EASE system 100 may enable a buyer 107 to evaluate the answers of vendors 108 to the General Information Questions (step 705). EASE system 100 may also enable buyer 107 to perform price and/or technical and/or narrative evaluations on each proposal (step 710). In certain embodiments, this price evaluation process may include two steps: Qualitative Price Analysis (step 715) and Quantitative Price Analysis (step 720). EASE system 100 may enable buyer 107 to perform a Qualitative Price Analysis evaluating each proposal considering the narrative qualities of the proposal (step 720). EASE system 100 may also enable buyer 107 to perform a numerical analysis considering the proposed unit price for each requirement given the amount of that requirement shown in the Forecast (step 720). For each unit price, EASE system 100 may enable buyer 107 to use various evaluation criteria to evaluate the unit price, including, for example, fairness, reasonableness, etc. EASE system 100 may enable buyer 107 to compare the proposed unit price to the Independent Cost Estimate for that requirement. EASE system 100 may enable buyer 107 to use the unit prices and/or the Forecast to evaluate the overall total cost of each vendors 108's proposal. EASE system 100 may enable buyer 107 to use a plurality of Forecasts to evaluate the total cost of each proposal that, for example, use different scenarios, consider volume discounts offered by vendors 108, etc.

EASE system 100 may enable buyer 107 to perform technical or narrative evaluation of proposals including considering vendors' 108 response to requirement designations. In certain embodiments, EASE system 100 may enable buyer 107 to evaluate vendors' 108 contributions to the conformance matrix and/or the compliance matrix.

EASE system 100 may also enable buyer 107 to issue deficiency notices and/or clarification requests to vendors 108. For example, in a deficiency notice, buyer 107 may use EASE system 100 to indicate to a vendor 108 how vendor 108's proposal does not meet the requirements in the request for proposal. In another example, in a clarification request, buyer 107 may use EASE system 100 to indicate areas of vendor 108's proposal that are unclear or need further explanation. EASE system 100 may enable vendor 108 to respond to any clarification requests (step 730). EASE system 100 may also enable vendor 108 to revise its proposal in response to deficiency notices (step 735).

EASE system 100 may also enable buyer 107 to rate each proposal using evaluation criteria (step 740). EASE system 100 may enable buyer 107 to "down-select," or reduce the number of eligible vendors 108 (step 745). Buyer 107 may use EASE system 100 to down-select if there are too many vendors 108 to practically perform discussions. In another embodiment, buyer 107 may use EASE system 100 to down-select when buyer 107 determines that a particular vendor is not a viable candidate for being a chosen vendor.

EASE system 100 may also enable buyer 107 to conduct discussions with remaining vendors 108 (step 755). During discussions, for example, buyer 107 might ask each vendor 108 additional questions about its proposal, about outstanding deficiency notices, unanswered clarification requests, etc. EASE system 100 may enable vendors 108 an opportunity to revise and/or finalize proposals (step 760). EASE system 100 may also enable vendors 108 to respond to additional questions from buyer 107 and revise proposals through multiple rounds.

The process illustrated in FIG. 7 shows one exemplary implementation consistent with embodiments of the instant invention. Of course, other method steps may be used, certain steps may be omitted, and the order of steps may vary without departing from the scope of the present invention. Although some of the steps are depicted in parallel, a person having skill in the art would recognize that these steps could be performed sequentially or in any other order.

Figure 8:
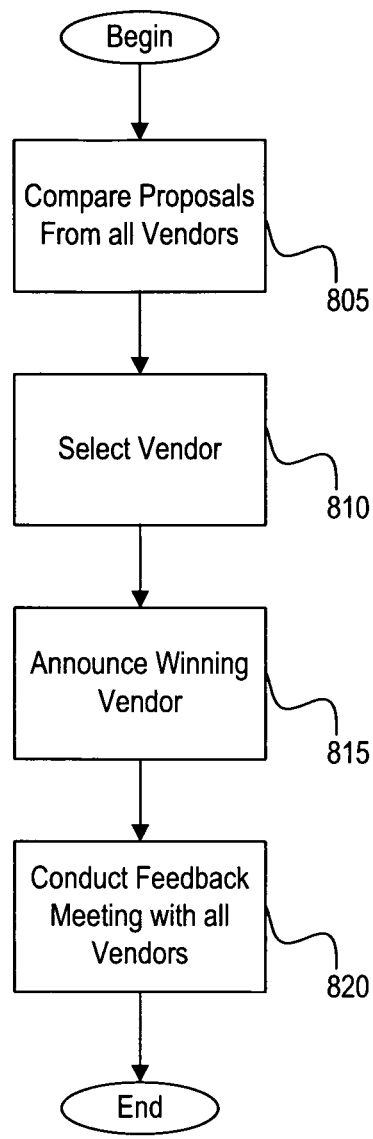
FIG. 8 depicts a module for awarding an agreement consistent with certain embodiments of the present invention.

FIG. 8 depicts a process for awarding an agreement consistent with certain embodiments of the present invention. The process depicted in FIG. 8 may be performed by a buyer 107 using electronic front-end 103, flexible data structure 101, etc. EASE system 100 may enable buyer 107 to compare proposals from vendors 108 (step 805). EASE system 100 may present the data stored by vendors 108 in flexible data structure 101 to enable buyer 107 to compare the proposals side-by-side, compare certain important requirements side-by-side, etc. In another embodiment, EASE system 100 may enable buyer 107 to perform an overall asset of "value" considering, for example, the products or services offered by each vendor 108, the Total Proposal Price, how well each vendor 108 responded to the mandatory requirements, etc. In one embodiment, EASE system 100 may enable buyer 107 to learn that one proposal has a lower unit price for a certain requirement, but only proposes to provide the product at 47 of the 48 requirements states. Continuing with this embodiment, a second proposal might have a higher unit price, but propose to provide the product in all 50 states and some international locations. In this embodiment, buyer 107 may use EASE system 100 to consult the error checking report to identify those mandatory requirements that the proposals do not address. EASE system 100 may also aid buyer 107 in comparing the overall rating of the proposals between two vendors.

EASE system 100 may also enable buyer 107 to select chosen vendor or vendors. (step 810). Buyer 107 and each chosen vendor will execute an agreement. In one embodiment, this agreement may be a simple combination of the requirements and the corresponding proposal and price element. In another embodiment, this agreement may include, for example, a Statement of Work or SOW, which may incorporate buyer 107's requirements and the chosen vendor's proposal.

EASE system 100 may also enable buyer 107 to announce one or more chosen vendors (step 815). EASE system 100 may enable buyer 107 to conduct a Feedback Meeting with vendors 108 (step 820). In the Feedback Meeting, both chosen and non-chosen vendors may be told the identify of the winner and given information about the strengths and weaknesses of their proposals, including information on how they can improve future proposals. Buyer 107 may use EASE system 100 to access flexible data structure 101 for information for a Feedback Meeting, including, for example, reports from the error checking function, deficiency notices, vendors 108's response to those notices, clarification requests, vendors 108's responses to those clarification requests, etc. Buyer 107 may also use EASE system 100 to query flexible data structure 101 to provide, for example, statistics to chosen and non-chosen vendors that may be helpful in possibly diffusing potential protests.

The process illustrated in FIG. 8 shows one exemplary implementation consistent with embodiments of the instant invention. Of course, other method steps may be used, certain steps may be omitted, and the order of steps may vary without departing from the scope of the present invention. Although some of the steps are depicted in parallel, a person having skill in the art would recognize that these steps could be performed sequentially or in any other order.

Figure 9:
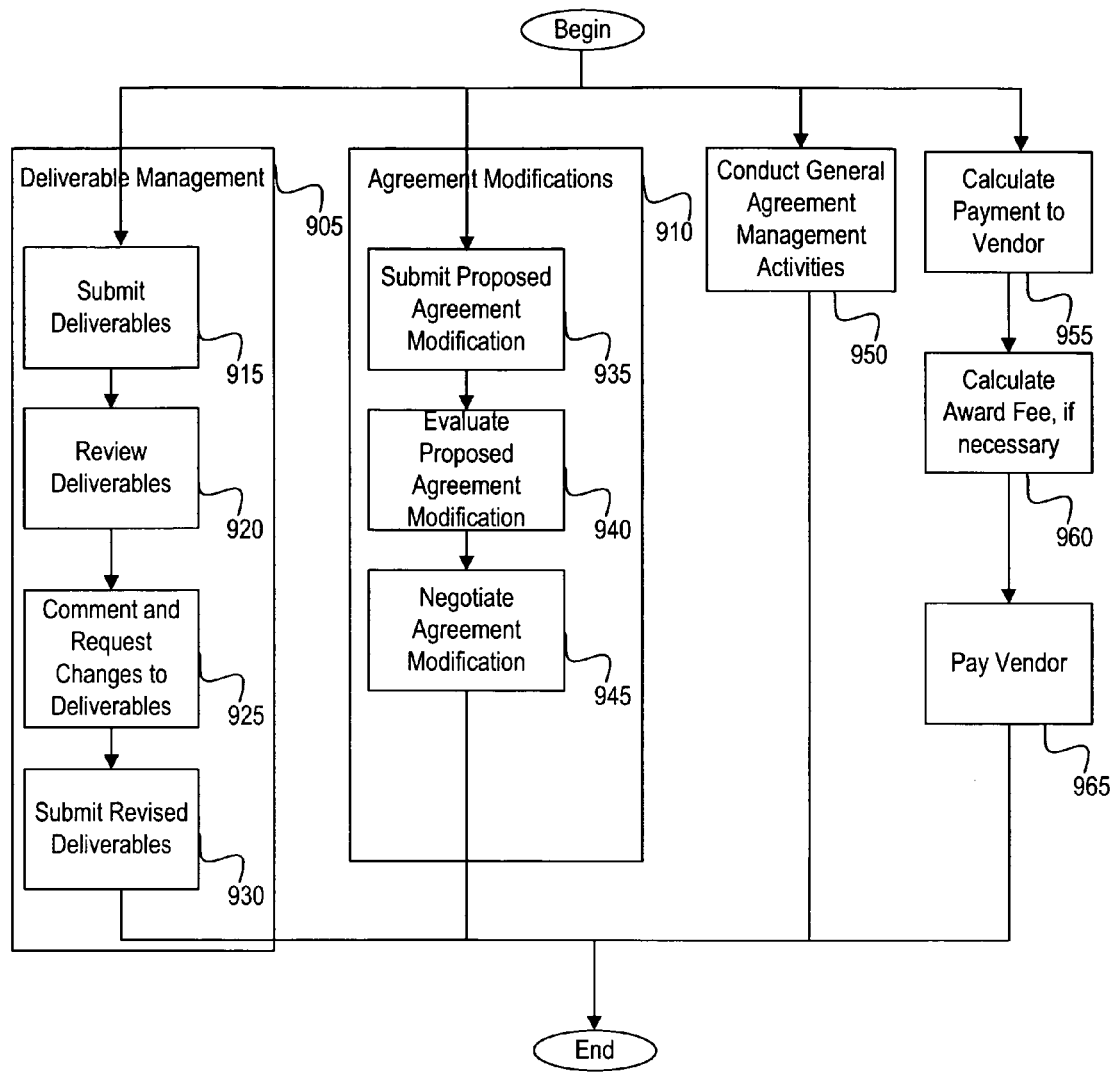
FIG. 9 depicts a module for managing and modifying an agreement consistent with certain embodiments of the present invention.

FIG. 9 depicts a process for managing and/or modifying an agreement consistent with certain embodiments of the present invention. The process depicted in FIG. 9 may be performed by buyer 107 and chosen vendors 850 using electronic front-end 103, in flexible data structure 101, etc. EASE system 100 enables chosen vendor to submit Deliverables as required by the agreement (step 915), buyer 107 to review Deliverables (step 920), buyer 107 to provide comments and requests to chosen vendor (step 925), etc. EASE system 100 may enable chosen vendor to submit revised Deliverables to buyer 107. EASE system 100 may use flexible data structure 101 to track when Deliverables are due or overdue to ensure timely agreement implementation.

A first party, either buyer 107 or a chosen vendor, may use EASE system 100 to submit a proposed agreement modification (step 935). For example, buyer 107 may gain additional personnel and require more desktop computers, or cheaper computers meeting buyer 107's requirements may have come onto the market and vendor may want to offer them to buyer 107. EASE system 100 may enable the second party to evaluate the agreement modification proposed by the first party (step 940). EASE system 100 may facilitate the parties in negotiating the terms of the agreement modification until they have reached an agreement. The parties may agree to access flexible data structure 101 through EASE system 100 as an "electronic" agreement containing the current agreement as well as previous versions and proposed agreement modifications.

Throughout the life of the agreement, EASE system 100 may enable buyer 107 to conduct general agreement management activities (step 950). These activities may include, for example, assigning and tracking various action items or tasks which need to be completed by either party to the agreement, tracking the schedule and/or risks to the schedule, including those events or issues that might affect the timely delivery of goods and services under the agreement, etc. Buyer 107 may use EASE system 100 to track communications between buyer 107 and the chosen vendor for the purposes, for example, of award fee determination, tracking the work proposed by the chosen vendor relative to the chosen vendor's actual performance, etc. EASE system 100 may enable buyer 107 to determine if buyer 107 should use the services of chosen vendor for future agreements. EASE system 100 may enable buyer 107 to store and/or catalog information about the formation of the agreement and/or changes to the agreement throughout its lifecycle, including, for example, deliverables, modifications, etc. EASE system 100 may also enable buyers to keep performance information to determine if the vendor is performing at the level specified in the agreement.

EASE system 100 may enable buyer 107 to calculate payment to chosen vendor (step 955). If the agreement contains an award provision, EASE system 100 may enable buyer 107 to calculate any award fee due to the chosen vendor (step 960). In certain embodiments, the award fee may be an additional amount paid to the chosen vendor based on the chosen vendor's performance during the previous award period. The award period may be, for example, annual, semi-annual, monthly, etc. EASE system 100 may enable buyer 107 to direct payment to chosen vendor (step 965).

The process illustrated in FIG. 9 shows one exemplary implementation consistent with embodiments of the instant invention. Of course, other method steps may be used, certain steps may be omitted, and the order of steps may vary without departing from the scope of the present invention. Although some of the steps are depicted in parallel, a person having skill in the art would recognize that these steps could be performed sequentially or in any other order.

Embodiments of the disclosed system may be implemented in various environments. Further, the processes described herein are not inherently related to any particular apparatus and may be implemented by any suitable combination of components. Further, various types of general purpose devices may be used in accordance with the teachings described herein.

The present invention has been described in relation to particular examples which are intended in all respects to be illustrative rather than restrictive. Different combinations of hardware, software, and firmware may be suitable for practicing embodiments of the present invention.

Additionally, other embodiments of the invention will be apparent to those skilled in the art from consideration of the specification and practice of the invention disclosed herein. For example, EASE system 100 may be used to the manage the acquisition of goods or services between multiple buyers and multiple vendors or between a single buyer and single vendor. EASE system 100 may be used by buyer 107 to develop, for example, a request for proposal, a request for offer, a solicitation, a request for quote, a screening information request, a request for information, a performance-based work statement, a statement of work, etc.

Furthermore, any of the method steps performed by buyer 107 using EASE system 100 could be performed by an agent of buyer 107 and likewise any of the method steps designated to be performed by vendor 108 using EASE system 100 could be performed by an agent of vendor 108. As such, any of the method steps could be performed, for example, by any employee, member, subsidiary of buyer 107 or vendor 108, etc. EASE system 100 may enable buyer 107 to purchase, rent, lease, option, barter, etc. services or products. EASE system 100 may enable buyer 107 or vendors 108 to be common carriers. EASE system 100 may be used to manage the acquisition of a good or service with only a single requirement. EASE system 100 may enable buyer 107 to award agreements to one or more vendors 108.

In one embodiment, EASE system 100 may enable buyer 107 to use a proxy or agent to define requirements or evaluate proposals. In this situation, while buyer 107's agent may, for example, use EASE system 100 to write clarification requests or deficiency notices, EASE system 100 may enable buyer 107 to still have the final decision of whether or not to release these clarification requests or deficiency notices to vendors 108. To do so, buyer 107 may need to access flexible data structure 101 through EASE system 100 and change permissions as to who can view certain fields of the database. In this manner, buyer 107 may maintain control over the process even though buyer 107's agent may use EASE system 100 to perform most of the work.

Throughout the acquisition process, EASE system 100 may enable buyers 107 and vendors 108 to store requirements, proposals, questions and answers from buyer 107, questions and answers from vendors 108, deficiency notices, clarification requests, discussion items, agreement deliverables, agreement modifications, etc. may all be in corporate memory 105. The information stored in corporate memory 105 may become helpful during any audits performed by, for example, buyer 107, any vendors 108, the appropriate third party, etc. Such an audit may occur, for example, during a protest by a chosen or non-chosen vendor or as a result of a breach of the agreement by either buyer 107 or chosen vendor. Information from flexible data structure 101 regarding deficiency notices, clarification requests and chosen or non-chosen vendor's responses help buyer 107 build a specific case to defend itself in a proceeding related to the chosen or non-chosen vendor's protest. In addition, this information may be used by an oversight organization to evaluate the general results and efficacy of the agreement. For example, the General Services Administration may oversee multiple agreements for desktop computers that have been let by different departments and/or agencies, such as the Department of Homeland Security or the Department of Labor. The General Services Administration might choose to compare the two desktop computer agreements to make suggestions to other federal government departments and/or agencies about how to best write an agreement for desktop computers.

Following the end of an agreement, EASE system 100 may enable buyer 107 to access corporate memory 105, library 102, etc., to acquire another agreement for similar goods or services in the future. Alternatively, EASE system 100 may enable other buyers to access the corporate memory 105 and the library 102 (e.g., to acquire the same or similar goods or services to buyer 107).

It is intended that the specification and examples be considered as exemplary only. To this end, it is to be understood that inventive aspects lie in less than all features of a single foregoing disclosed embodiment, implementation, or configuration. Thus, the true scope and spirit of the invention is indicated by the following claims.

What is claimed is:

1. A computer-implemented method for facilitating a process for a buyer to make an acquisition using an interactive tool, the method comprising:
receiving, by the interactive tool, requirements for the acquisition from the buyer;
representing each of the requirements as a stored data element in a data structure associated with the interactive tool;
presenting, by the interactive tool, a request for proposal based on the stored data elements to potential vendors for the acquisition;
representing, by the interactive tool, a proposed solution to the request for proposal by at least one of the potential vendors, wherein the proposed solution links the requirements for the acquisition with one or more solutions;
providing, by the interactive tool, a notice to the at least one potential vendor when the proposed solution does not include a solution for every requirement for the acquisition;
representing each of the one or more solutions and the notice as a stored data element in the data structure associated with the interactive tool; and
providing, by the interactive tool, analysis to the buyer using the linked data elements representing the requirements for the acquisition and the proposed solution to facilitate the buyer selecting a chosen vendor for the acquisition.

2. The method of claim 1, wherein receiving the requirements further includes:
accessing a library of requirements including one or more of: requirements previously used by the buyer; requirements specified by a government regulation; and standard acquisition requirements.

3. The method of claim 1, wherein receiving the requirements further includes:
providing a requirements template to the buyer via the interactive tool;
receiving a particular requirement from the buyer via the requirements template;
determining whether the particular requirement conforms to the requirements template; and
storing the particular requirement in the data structure, when the particular requirement conforms to the requirements template.

4. The method of claim 3, wherein providing the requirements template increases accuracy of the received set of requirements.

5. The method of claim 3, wherein providing the requirements template reduces time needed to receive the set of requirements.

6. The method of claim 1, wherein presenting the request for proposal further includes:
applying a standard format for displaying the request for proposal using the stored data elements.

7. The method of claim 6, wherein the standard format reduces time to develop the proposed solutions.

8. The method of claim 6, wherein the standard format increases accuracy of the proposed solutions.

9. The method of claim 1, further including enabling development of proposed solutions by:
accessing a library of possible proposed solutions including at least one of: a solution previously used by one of the vendors; a solution previously accepted by the buyer; a solution specified by a government regulation; and a standard solution for the acquisition.

10. The method of claim 1, wherein linking the one or more solutions with the requirements for the acquisition includes:
alerting each vendor to the data elements representing the requirements for the acquisition; and
requiring each vendor to coordinate the one or more solutions to the data elements representing the requirements for the acquisition.

11. The method of claim 1, further comprising, for a primary requirement in the requirements:
receiving a solution of a vendor's proposed solution for the primary requirement;
determining, via the data structure, that the primary requirement has a related requirement;
notifying the vendor of the related requirement; and requiring the vendor to provide a solution for the related requirement that corresponds to the solution received for the primary requirement.

12. The method of claim 1, further comprising:
presenting, by the interactive tool, a request for additional information for the request for proposal from the buyer to the vendor.

13. The method of claim 1, further comprising, for a primary requirement in the requirements:
receiving a solution of a vendor's proposed solution for the primary requirement;
determining, via the data structure, that the primary requirement has a related requirement;
notifying the buyer of a missing proposed solution for the related requirement; and
requiring the vendor to provide a solution for the related requirement that corresponds to the solution received for the primary requirement.

14. A computer-implemented method for facilitating a process for a buyer to make an acquisition using an interactive tool, the method comprising:
receiving, by the interactive tool, requirements for the acquisition from the buyer;
representing each of the requirements as a stored data element in a data structure associated with the interactive tool;
presenting, by the interactive tool, a request for proposal based on the stored data elements to potential vendors for the acquisition;
representing, by the interactive tool, a proposed solution to the request for proposal by at least one of the potential vendors, wherein the proposed solution links the requirements for the acquisition with one or more solutions;
providing, by the interactive tool, a notice to the at least one potential vendor when the proposed solution does not include a solution every requirement for the acquisition;
representing each of the one or more solutions and the notice as a stored data element in the data structure associated with the interactive tool;
providing, by the interactive tool, analysis to the buyer using the linked data elements representing the requirements for the acquisition and the proposed solution to facilitate the buyer selecting a chosen vendor for the acquisition;
providing, through the interactive tool, an alert notifying the at least one potential vendor that the buyer has altered the requirements for the acquisition; and
receiving revisions to the proposed solution based on the buyer's altered requirements for acquisition.

15. The method of claim 14, further including providing a notice to the buyer when the proposed solution does not provide a solution for every requirement for the acquisition.

16. The method of claim 14, further including enforcing a pre-determined schedule further by allowing the buyer to control the timing of a release of comments to the one or more vendors.

17. The method of claim 16, wherein the comments include at least one of: clarification requests, deficiencies notices, and discussion items.

18. A computer-implemented interactive acquisition system for enabling a buyer to make an acquisition according to a predetermined schedule, comprising:
one or more memories storing instructions; and
one or more processors configured to execute the instructions to perform:
receive requirements for the acquisition from the buyer;
represent each requirement as one or more data elements in a data structure;
present the requirements to potential vendors for the acquisition;
represent a proposed solution to the requirements by at least one of the potential vendors, wherein the proposed solution links the requirements for the acquisition with one or more solutions;
provide a notice to the at least one potential vendor when the proposed solution does not include a solution for every requirement for the acquisition;
represent each of the one or more solutions and the notice as a stored data element in the data structure associated with the interactive tool; and
facilitate the buyer in implementing a pre-determined schedule for selecting a chosen vendor for the acquisition from among the one or more potential vendors.

19. The system of claim 18, further comprising a library configured to:
maintain one or more requirements previously used by the buyer; and
maintain one or more proposed solutions previously used by the vendor.

20. The system of claim 19, wherein the one or more processors are further configured to execute the instructions to perform:
retrieve a requirement previously used by the buyer from the library; and
present the retrieved requirement to the buyer while receiving the requirements from the buyer.

21. The system of claim 19, wherein the one or more processors are further configured to execute the instructions to perform:
retrieve a proposed solution previously used by the vendor from the library; and
present the proposed solution to the vendor while enabling development of the vendor's proposed solution.

* * * * *